United States Patent [19]

Minoura

[11] 4,248,495
[45] Feb. 3, 1981

[54] PROJECTING OPTICAL SYSTEM WITH DEFLECTED OPTICAL AXIS MAINTAINED PARALLEL TO NEXT OPTICAL AXIS

[75] Inventor: Kazuo Minoura, Yokohama, Japan

[73] Assignee: Canon Kabushiki Kaisha, Tokyo, Japan

[21] Appl. No.: 36,511

[22] Filed: May 7, 1979

[30] Foreign Application Priority Data

May 8, 1978 [JP] Japan .................................. 53-54260

[51] Int. Cl.³ ....................... G02B 27/17; G03B 27/68
[52] U.S. Cl. .................................... 350/6.3; 350/6.6; 350/6.8; 250/235; 355/51; 355/52
[58] Field of Search ............................. 350/6.1–6.91; 355/8, 66, 50, 51, 52; 358/205, 206, 208, 285; 250/235, 236

[56] References Cited

U.S. PATENT DOCUMENTS

3,576,368  4/1971  Goetz ................................... 355/66

Primary Examiner—Jon W. Henry
Attorney, Agent, or Firm—Fitzpatrick, Cella, Harper & Scinto

[57] ABSTRACT

A projecting optical system having a first lens system, on one focal plane of which a first plane is disposed, a light beam deflector disposed on the opposite side of the first plane relative to the first lens system and to deflect light beams in a predetermined direction, and a second lens system which receives light beams from the light beam deflector and collects the same on a second plane disposed on its focal plane, wherein the first and second lens systems have one and the same distortional characteristic, the distortion to be generated in the first lens system is compensated by the distortion to be generated in the second image-forming lens system, irrespective of the deflecting action of the deflector, to thereby sequentially project the image on the first plane onto a predetermined position on the second plane.

7 Claims, 15 Drawing Figures

PROJECTING OPTICAL SYSTEM WITH DEFLECTED OPTICAL AXIS MAINTAINED PARALLEL TO NEXT OPTICAL AXIS

BACKGROUND OF THE INVENTION

This invention relates to a projecting optical system having a light beam deflector.

Figure 1:
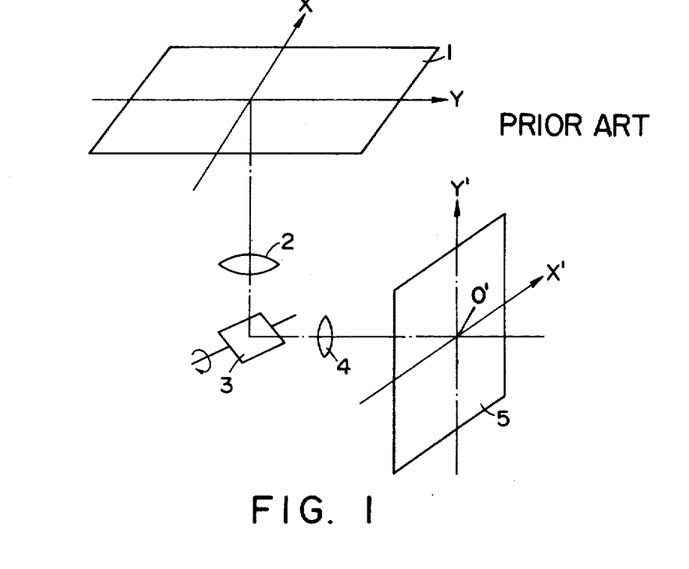
FIG. 1 is a schematic diagram for explanation of one embodiment of a conventional projecting optical system.

There has heretofore been known an optical system as shown in FIG. 1 which is one example of an optical system to project a light beam on a second plane, while scanning a first plane with a light beam deflector. In the optical system shown in FIG. 1, a reference numeral 1 designates a first plane, and numeral 2 refers to a so-called f·tan θ lens having one of its focal points on the first plane and being free from distortion. A numeral 3 refers to a deflector, in accordance with rotation of which the first plane is scanned in the direction of an axis Y. A numeral 4 also designates an f·tan θ lens which is so disposed that one of its focal planes may coincide with the second plane 5. Accordingly, the light beam of the plane 1 is rendered a parallel light beam by the f·tan θ lens 2 and this parallel light beam is deflected by the deflector 3, after which it is focused on the second plane 5 by the f·tan θ lens 4 in the same manner as above. A lens system, in which the first plane and the second plane are made conjugative by such layout, is called a 'tandem' lens system. As has been well known, the purpose of this f·tan θ lens is to focus the parallel light beam entering at an incident angle of θ with respect to the optical axis of the lens in such a manner that a distance y from the optical axis may satisfy the following relationship on its focal plane: y=f·tan θ. In case the deflector 3 is interposed between these f·tan θ lenses 2 and 4 constituting the tandem system, an image component in the X direction which orthogonally intersects with the principal scanning direction Y on the first plane 1 can be focused on the second plane free from distortion.

In the abovementioned projecting optical system, when it is desired to impart a desired deflecting angular speed characteristic to the deflector, or when it is desired to impart to it a desired scanning speed in the principal scanning direction Y of the first plane, it is necessary to use as the lens constituting the tandem system, a lens having a distortional characteristic in place of an f·tan θ lens having no distortional characteristic. However, when the lens having the distortional characteristic is replaced by the f·tan θ lens (2, 4) in the projecting device shown in FIG. 1, the image component in the X direction which orthogonally intersects with the principal scanning direction Y of the first plane 1 to be projected on the second plane 5 accompanies the distortion.

SUMMARY OF THE INVENTION

It is an object of the present invention to provide a projecting optical system which does not cause any distortion in an image on the projecting surface, even when a lens having a distortional characteristic is used as a lens which constitutes a 'tandem' system.

The abovementioned object of the present invention can be accomplished by offsetting a distortion to occur in the first image-forming optical system with a distortion in the second image-forming optical system, when an optical system having a distortional characteristic is used for the first and second image-forming optical system constituting the tandem system which holds therebetween the light beam deflector. in other words, there is used such an optical system that, irrespective of the deflecting action of the deflector, the distortion to occur in the second image-forming optical system may be substantially equal to the magnitude of the distortion to occur in the first image-forming optical system, and a symbol therebetween is just opposite.

The abovementioned object of the present invention can also be accomplished in such a manner that, irrespective of rotational movement of the deflector, the optical axes of the lens systems to be provided, with the deflector interposed therebetween, may always be made parallel to each other through the deflector. That is to say, the projecting device according to the present invention comprises a first lens system, one of the focal planes of which is disposed on the first plane, a light beam deflector which is disposed on the opposite side to the first plane relative to the first lens system and which deflects the light beam in a predetermined direction, and a second lens system which receives the light beam from the light beam deflector and collects the same on the second plane provided on the focal plane, thereby projecting an image on the first plane onto the second plane, in which the first and second lens systems have one and same distortional characteristics, and, by providing means to constantly maintain in parallel the optical axis of the first lens system deflected by the deflector and the optical axis of the second lens system with respect to rotational movement of the deflector, the first plane can be projected onto the second plane free from distortion.

In the projecting optical system according to the present invention, the optical axis of the second lens system is tilted in synchronism with the deflecting angle of the deflector as the means for holding the optical axes of the first and second lens systems in parallel. In such expedient, the position of the focal plane of the second lens system is not constant. Accordingly, it is desirable that means to hold the position of the second plane on the focal plane of the second lens system be provided. For this purpose, an optical member to compensate a light path length be provided between the second image-forming lens system and the second plane either by shifting the position of the second plane in the direction of the optical axis in synchronism with inclination of the second lens system, or by fixing the second plane. For the optical member for compensating such light path length, mirror and prism have been commonly known.

DESCRIPTION OF PREFERRED EMBODIMENTS

Figure 2:
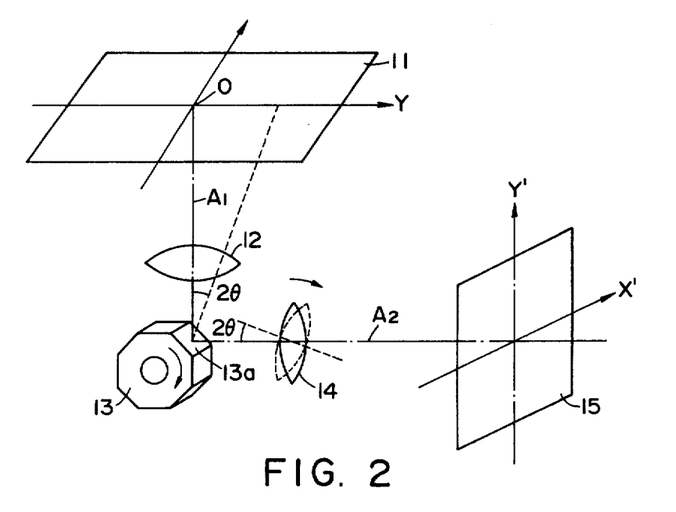
FIGS. 2, 3A and 3B are respectively schematic diagrams for explaining the principle of the projecting optical system according to the present invention.
Figure 3A:
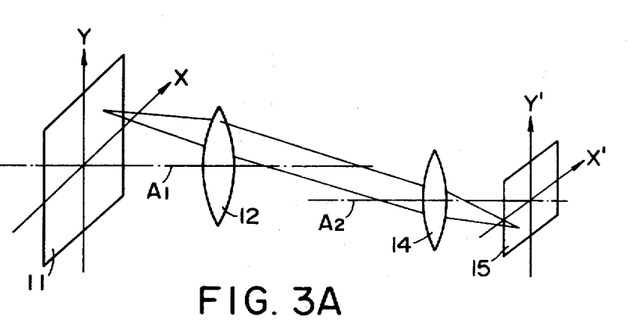
Figure 3B:
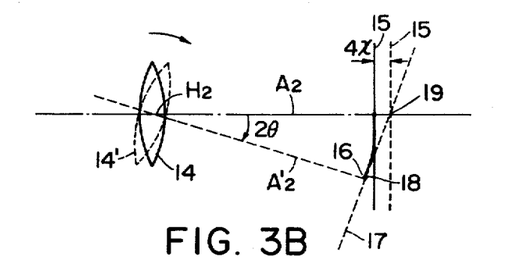

FIGS. 2, 3A and 3B are respectively schematic diagrams for explanation of the principle of the projecting device according to the present invention, in which the second lens system is shown to be tilted with rotation of the deflector, as one example of the means for maintaining in parallel the optical axes of the first and second lens systems. FIG. 2 is a perspective view showing schematically the projecting device, wherein a reference numeral 11 designates a first plane, a numeral 12 refers to a first lens system having a distortional characteristic and having one of its focal planes disposed on the first plane, a numeral 13 refers to a deflector, and 14 denotes a second lens system having the same distortional characteristic as that of the first lens system and having one of its focal planes disposed on a second plane 15. This second lens system 14 is tilted with its rear principal point (the side of the second plane) as the pivot as the deflector rotates, the cross-section of the tilt constituting a plane parallel with a plane, at which the light beam from the first plane 11 is deflected by the deflector 13. A tilting angle of the second lens system is twice as large as the deflecting angle of the deflector 13. In more detail, assume that a position where the optical axis $A_1$ of the first lens system 12 intersects with the first plane 11 is O, and a light beam from this point O passes along the optical axis $A_2$ of the second lens system having no tilting function, when the deflecting plane 13a of the deflector 13 is at a reference position for rotation, and reaches a point O' on the second plane 15. Subsequently, when the deflector 13 rotates by $\theta$ degrees, the optical axis of the first lens appears as if it were tilted by an angle of $2\theta$ with respect to the optical axis of the second lens system 14 in the abovementioned cross-section of tilt, as viewed from the side of the second lens system 14. In order, therefore, that the optical axis $A_1$ of the first lens system 12 may be made parallel with the optical axis $A_2$ of the second lens system 14 by interposing the deflecting plane 13a, the second lens system may be tilted by an angle $2\theta$ within the cross-section of tilt. FIG. 3A is a schematic development diagram of the abovementioned lens system 12 and 14 when the tilting is done as such. (It should be noted that, in FIG. 3A, the deflector is omitted from illustration.) At this instance, if the lens systems 12 and 14 are constructed with a lens system having an equal distortional characteristic, and both lens systems are laid out in 'tandem,' an angle which the projecting light beam from the lens system 12 assumes with the optical axis $A_1$ of the lens system 12 is equal to an angle which the incident light beam into the lens system 14 assumes with the optical axis $A_2$ of the lens system 14. In this case, the distortion to occur in the lens system 12 is offset by the distortion to occur in the lens system 14, and a pattern to be formed on the second plane which is an image-forming plane of the lens system 14 becomes similar to the pattern on the first plane, and no distortion occurs.

As shown in FIGS. 2 and 3A, when the second lens system 14 is tilted with its rear principal point as the pivot, its focal plane also rotates. In other words, the position of the focal plane moves on an arc 16 with the rear principal point $H_2$ as the center of curvature, as shown in FIG. 3B. Accordingly, a focal plane 17 of the second lens 14' which has been rotated by an angle $2\theta$ includes an intersection 18 of an optical axis $A_2'$ and the arc 16, and constitutes a plane perpendicular to the optical axis $A_2'$. When the second plane 15 is moved to the position 19 where the focal plane 17 and the optical axis $A_2$ mutually intersects, it is possible to form an image on the second plane. The moving quantity $\Delta x$ can be given in the following equation:

$$\Delta x = f_2\{(1/\cos 2\theta) - 1\} \tag{1}$$

In the following, explanation will be given as to the projecting optical system according to the present invention shown in FIG. 2, wherein the principal scanning direction, i.e., the Y direction on the first plane 11, is scanned at an equal speed. In the case of scanning the principal scanning direction at an equal speed, such equal speed scanning can be accomplished due to multiple effect of the distortional characteristic of the lens systems 12 and 14 forming the tandem system and the rotational characteristic of the deflector 13. While various combinations between the distortional characteristic of the lens systems 12 and 14 and the rotational characteristic of the deflector 13 can be contemplated, explanations hereinbelow will be directed to a rotatory polygonal mirror of equi-angular speed deflection and a galvano-mirror of non-equi-angular speed deflection, both of which are generally used as the deflector.

When the rotatory polygonal mirror which performs the equi-angular speed deflection, as shown in the drawing, is used as the deflector 13, an $f-\theta$ lens is used for the lens systems 12 and 14. The $f-\theta$ lens is a lens which focuses an incident parallel light beams at an angle $\theta$ with respect to the optical axis thereof on the focal plane of the lens in an image height of $y = f \cdot \theta$ (where f is a focal length of the lens) from the optical axis. Since the image formed in the X direction, which orthogonally intersects with the principal scanning direction Y, is one which has no distortion as mentioned in the foregoing, the following explanations will also be directed to a situation, in which no distortion occurs in the principal scanning direction. Assume now that a conjugative position on the first plane 11, the image of which is projected onto the second plane 15 during a time period t, shifts on the axis Y by a length ly. In this case, the following relationship is established:

$$ly = f_1 \cdot \omega \cdot t$$

From the above equational relationship, the displacing speed dly/dt of the conjugative position will be represented as follows:

$$dly/dt = f_1 \omega = \text{constant}$$

(where: $f_1$ is a focal length of the first lens system). From the above relationship, the informations in the direction of the axis Y on the first plane 11 can also be projected on the second plane 15 at a certain definite distance interval with respect to a certain definite time interval. Accordingly, the informations on the first plane 11 can be projected on the second plane 15 without any distortion whatsoever with lapse of time.

Next, when the galvano mirror is used as the deflector 13, an $f - \arcsin \theta$ lens is used for the lens systems 12 and 14. This $f - \arcsin \theta$ lens is such one that focuses the incident parallel beams at an angle $\theta$ with respect to the optical axis thereof on the focal plane at a position represented by the following equation from the optical axis:

$$y = 2\phi_0 f \sin^{-1}(\theta/2\phi_0)$$

(where: $\phi_0$ is an amplitude of the galvano mirror, and f is a focal length of the lens, and rotation $\phi$ of the galvano mirror is represented by $\phi = \phi_0 \sin(kt)$ (k=constant)). Here, explanations will be given as to the facts that the scanning in the direction of the axis Y on the first plane 11 is done at an equal speed, and the informations in the direction of the axis Y on the first plane is projected on the second plane 15 free from distortion. Assume that rotation of the galvano mirror is represented by $\phi = \phi_0 \sin(kt)$ and the conjugative position on the first plane to be projected on the second plane during a time t shifts on the axis Y by ly. In this instance, the following relationship is established:

$$ly = 2\phi_0 \cdot f_1 \cdot \sin^{-1}(\frac{\theta}{2\phi_0})$$
$$= 2\phi_0 \cdot f_1 \cdot kt$$

From the above equation, the displacing speed dly/dt of the conjugative position on the first plane is represented as follows:

$$dly/dt = 2\phi_0 f_1 \cdot \omega = \text{constant}$$

(where: $f_1$ is a focal length of the first lens system). From this, the informations on the axis Y is projected on the second plane at a certain definite distance interval with respect to a certain time interval. As the consequence, there is no distortion on the axis Y to occur relative to time.

In the above-described galvano mirror, vibration of the mirror is made sinusoidal. However, when the vibratory characteristic of the mirror is represented by, for example, $\phi = \frac{1}{2}\sin^{-1}(kt)$, the distortional characteristic of the lens systems 12 and 14 is represented by $y = f \sin \theta$; in other words, a so-called Fourier conversion lens may be used.

Figure 4:
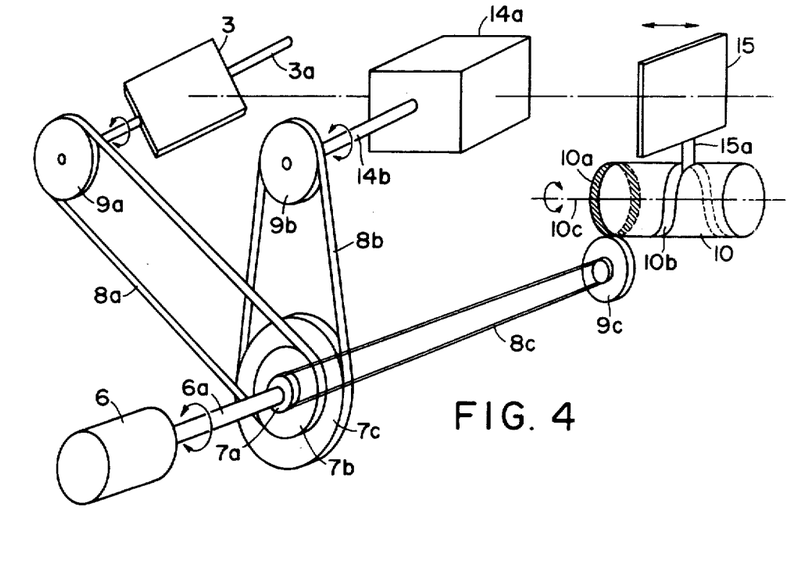
FIG. 4 is a schematic perspective view of one embodiment of a drive mechanism in the projecting optical system according to the present invention.

FIG. 4 is a schematic perspective view illustrating one embodiment of a drive mechanism in the projecting device according to the present invention. As shown in the drawing, multi-staged gears having three rotary gears 7a, 7b and 7c, each being different in diameter, are fixedly provided on the other end of a rotational shaft 6a opposite to one end where it is connected to a galvar drive system 6 to rotate a galvano mirror 3. Accordingly, when the shaft 6a rotates, the gears 7a, 7b and 7c also rotate, and the rotational force from these gears is transmitted to other gears 9a, 9b and 9c through respective chains 8a, 8b and 8c. On a rotational shaft 3a of the gear 9a, the galvano mirror 3 is fixedly mounted. On a rotational shaft 14b of the gear 9b, there is fixedly mounted a casing 14a which accommodates therein the second lens system. The respective sizes of the gears 7b, 7c, 9a and 9b are so established that the casing 14a may rotate at an angle twice as large as the rotational angle $\theta$ of the deflector 3, as already mentioned in the foregoing. On the other hand, the gear 9c is meshed with a gear 10a provided at one end of a cylinder 10 having a spiral notch 10b in its surface part. When the gear 9c rotates, the cylinder 10 rotates on its center shaft 10c. The spiral notch 10b is engaged with a shaft 15a fixedly provided in one part of the second plane 15. When the cylinder 10 rotates, the second plane 15 moves along the direction of the shaft 10c. This moving quantity $\Delta x$ may be determined in accordance with the above equation (1).

In the embodiment as shown in FIG. 4, explanations have been made with respect to a situation, wherein the second plane is shifted. As a matter of practice, however, it is desirable that a member to compensate a light path length be provided between the second plane and the second image-forming lens system. In this case, if the light path length compensating member is a flat reflecting mirror, the light path length can be compensated by moving the flat reflecting mirror on the optical axis using a mechanism such as, for example, that shown in FIG. 4. If, on the other hand, the light path length compensating member is made of a prism or the like, the compensation is possible by varying the prism on the optical axis.

Figure 5:
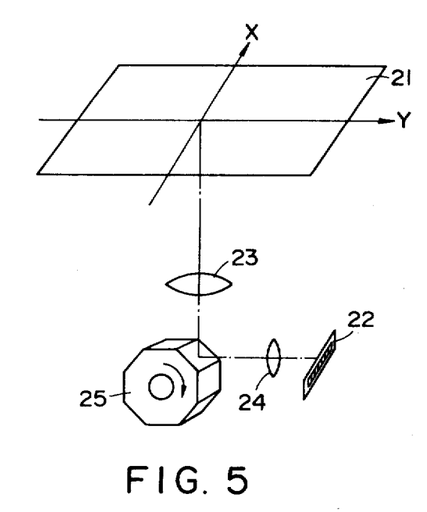
FIG. 5 is a schematic diagram showing one embodiment of a reading device, to which the projecting optical system of the present invention is applied.

The projecting device according to the present invention finds its use in various fields such as reading of an image original surface, writing of informations into a medium, and so forth. In the following, explanations will be given, as one example of application of the above-described projecting device, as to a scanning and reading device, in which an image original surface 21 is utilized as the first plane, and a photo-sensor array 22 for reading as the second plane, as shown in FIG. 5. In the device as shown in FIG. 5, each of the lens systems 23 and 24 is composed of an image-forming lens having the same $f - \theta$ characteristic. A reference numeral 25 designates a rotatory polygonal mirror which performs an equi-angular speed deflection. The lens system 24 is tilted in such a manner that, as mentioned in the foregoing, the optical axis thereof may be substantially parallel with the optical axis of the lens system 23 in accordance with the rotational angle of the rotatory polygonal mirror. The photosensor array 22 is composed of N numbers of photosensors arranged along an axis X' on the second plane 15 shown in FIG. 2.

Figure 6:
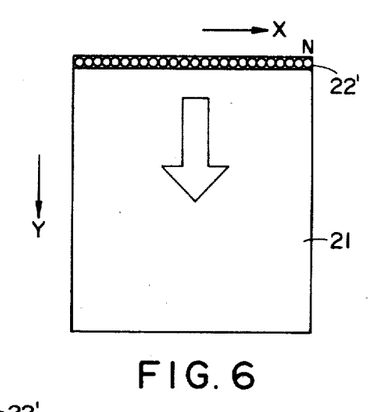
FIGS. 6 and 7 are respectively diagrams showing a way, in which informations are read out by the reading device shown in FIG. 5.

FIG. 6 shows a state, in which a conjugated image 22' of the photosensor array 22 is scanned in the direction Y on the image original surface 21 with rotation of the rotatory polygonal mirror 25. The photosensors are arranged in N numbers in the direction of X. If these N numbers of the photosensors in the array are time-sequentially read in synchronism with rotation of the rotatory polygonal mirror, all the informations on the image original surface can be read out without distortion by carrying out single scanning operation in the direction of Y by this rotatory polygonal mirror.

Figure 7:
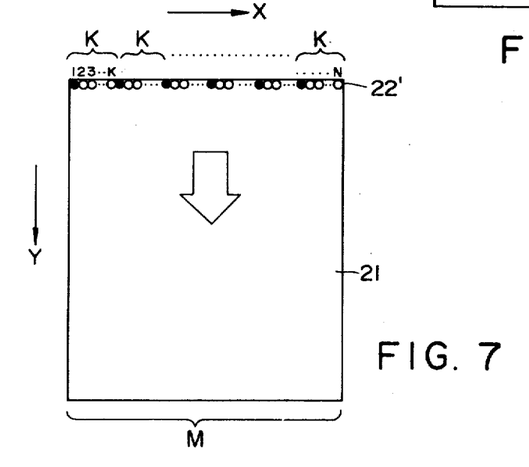

In the following, explanations will be given as to reading of informations on one scanning line with M numbers of arrays (N/M = K, where M and K are integers) of the photosensors 22 in N numbers as shown in FIG. 7. The first scanning operation is performed in the Y direction of the image original surface 21 with the first plane of the rotatory polygonal mirror 25 by means of total M numbers of arrays in the photosensor array 22 consisting of the first, the K'th, the 2K'th, . . . the (M−1)K'th. The second scanning operation is done by the second plane of the rotatory polygonal mirror. At that time, reading of the informations is done by the total M numbers of the arrays consisting of the second, the (K+1)'th, . . . the {(M−1)K+1}'th in the photosensor array. In general, when the I'th scanning is performed on the I'th surface of the rotatory polygonal mirror (where: I is an integer having a relationship of I ≤ K), the informations are repeatedly read out as they are time-sequentially scanned in the Y direction for each scanning line by means of the total M numbers of the I'th, the (K+1)'th, . . . the {(M−1)K+I}'th in the photosensor array. The repetition, as a matter of course, is synchronous with rotation of the rotatory polygonal mirror. When the rotatory polygonal mirror rotates for K numbers of its planes, as described above, all the informations on the image original surface can be read out. Such method of reading the informations by dividing the photosensor array is particularly effective when it is applied to an interlace system (disclosed in Laid-Open Japanese Patent Application No. 53-3230) which is one of the writing method in ink-jet printer.

Also, the photosensor array 22 varies its position on the optical axis of the lens system 24 with tilting of the lens 24 in accordance with the relationship represented by the above equation (1), as already explained with respect to FIG. 4.

The above-described embodiment is such one that the scanning in the X direction is performed electrically. In the following, explanations will be given as to another embodiment, in which the scanning in the X direction is done mechanically.

Figures 8, 9, 10:
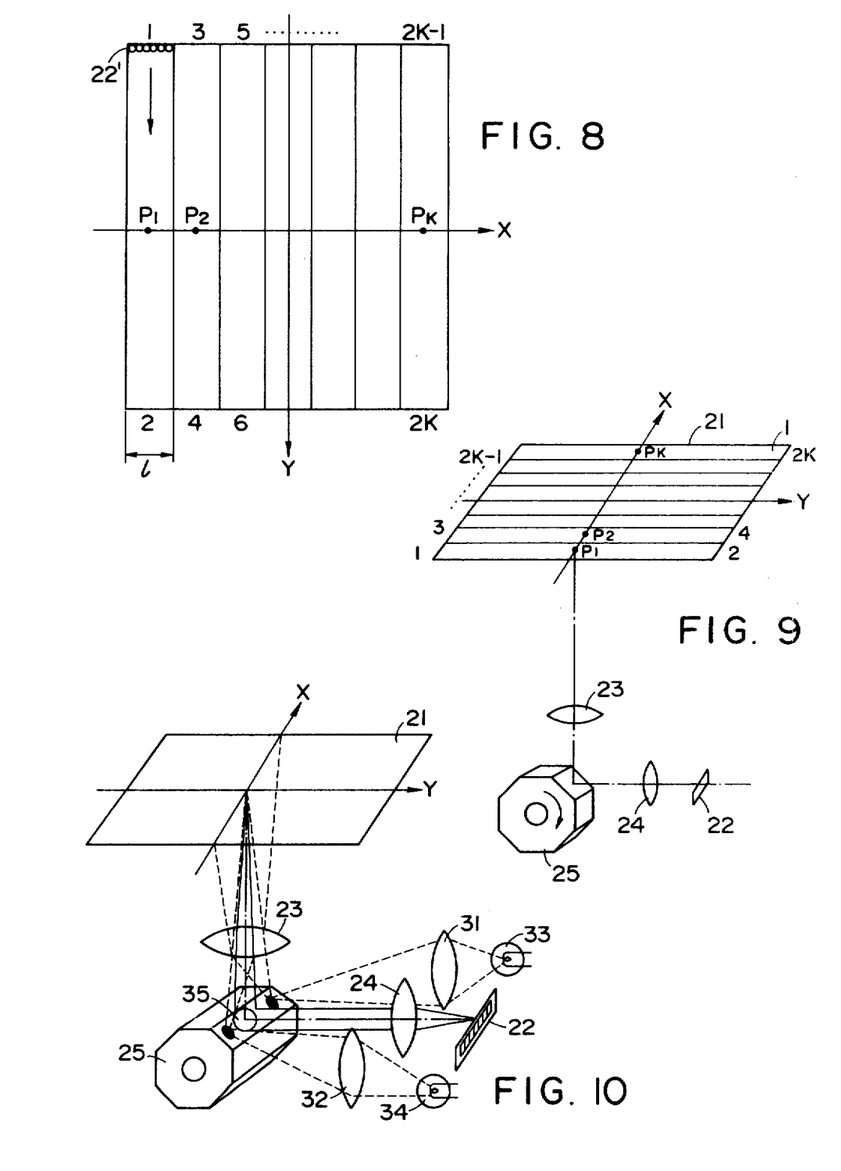
FIGS. 8 and 9 are respectively diagrams for explanation of other reading device, to which the projecting optical system of the present invention is applied.
FIGS. 10, 11, 12, 13 and 14 are respectively schematic diagrams for explanation of various embodiments of illuminating optical system used for the reading device.

FIG. 8 illustrates that a conjugated image 22' of the photosensor scans the image original surface divided into a plurality of bands in k numbers (1-2, 3-4, 5-6, . . . (2k−1)-2k). The scanning in the Y direction is done by a deflecting mirror, same as the abovementioned embodiment, and the scanning in the X direction is done by relatively moving the image original surface and the entire scanning system.

FIG. 9 shows an optical system at the above-described scanning operation, wherein the positional relationship of the image original and the scanning optical system is such that the optical axis of the lens system 23 and the image original surface 21 orthogonally intersect at a central point P$_1$ of the first band 1-2. In this state, the deflecting mirror 25 is rotated to scan the band 1-2 in the Y direction. Next, either the image original surface 21 or the entire scanning system is moved parallelly to cause the optical axis of the lens system 23 to coincide with the central point P$_2$ of the band 3-4, after which the band 3-4 is scanned by the deflecting mirror in the same manner as above. By repeating the operations upto the band (2k−1)-2k, all the informations on the image original surface can be read out. In this case, the lens system 24 and the photosensor 22 in the scanning system are relatively fixed to the lens system 23, whereby the lens system 23 does not rotate as in the previous embodiment, hence the photosensor does not move, too. If it is assumed that the width of each band is l which is smaller than the focal length f$_{23}$ of the lens system 23, the distortion in the breadthwise direction is negligible. In this case, the informations of the image original surface can be read out in the state of the lens system 24 and the photosensor 22 being in a mutually fixed condition with respect to the lens system 23.

Figure 11:
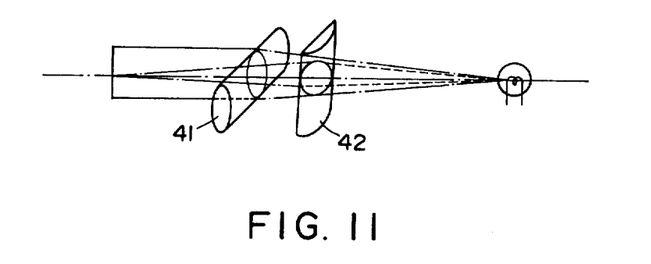
Figure 12:
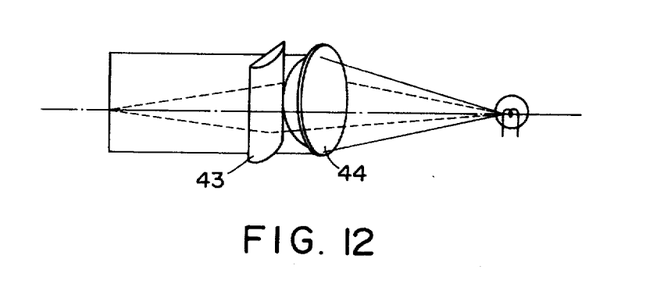

FIG. 10 illustrates one example of a method for illuminating an image original in the reading device shown in FIG. 5. In the drawing, the lens systems 31 and 32 are of anamorphic illuminating type which forms a linear image, and consist of either cylindrical lenses 41 and 42, the generatrices of which orthogonally intersect as shown in FIG. 11, or a rotationally symmetrical lens 44 and a cylindrical lens 43 as shown in FIG. 12. The line image is such that it may be formed in the direction perpendicular to the rotational axis of the rotatory polygonal mirror 25.

Figure 13:
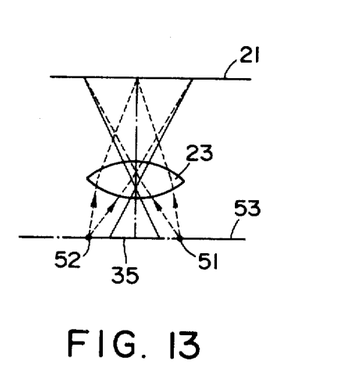

FIG. 13 represents a state within the plane including the axis X and the optical axis of the lens system 23 in FIG. 10, in which reference numerals 51 and 52 respectively designate points in the illuminating light beam on a line 53 on the rotatory polygonal mirror 25. The image original 21 is irradiated in the X direction by the lens system 23 with these points 51 and 52 as the secondary light sources.

Figure 14:
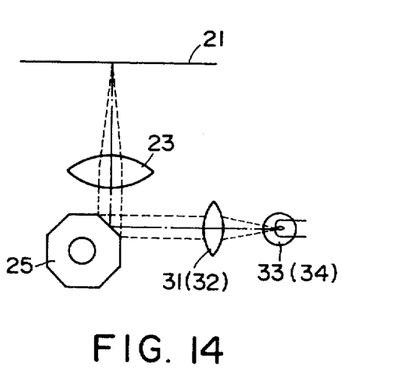

FIG. 14 is a diagram within a cross-section which orthogonally intersects with the plane shown in FIG. 13. Within this plane, the incident light beam entering the lens system 23 is substantially parallel and is collected on the image original 21 in linear form by the lens system 23. In this case, the positions of the abovementioned secondary light sources (51 and 52 in FIG. 13) emitting from the illuminating lens systems 31 and 32 and reaching the reflecting surface of the deflecting mirror 25 are placed on the pupil of the lens system 23 as well as outside the pupil of the lens system 24 so that the regular reflection light of the light source due to the image original surface may not enter into the photosensor by the lens systems 23 and 24.

What I claim:

1. A projecting optical system, comprising:
   (a) a first plane;
   (b) a first image-forming optical system, one of the focal planes of which is disposed on said first plane;
   (c) deflecting means to deflect parallel light beams from said first image-forming optical system in a predetermined direction;
   (d) a second image-forming optical system having the same distortional characteristic as that of said first image-forming optical system, and collecting the parallel light beams deflected by said deflector;
   (e) a second plane disposed in substantial coincidence with one of the focal planes of said second image-forming optical system; and
   (f) first means to constantly maintain in parallel the optical axis of said first image forming optical system after deflection by said deflecting means and the optical axis of said second image forming optical axis.

2. The projecting optical system as set forth in claim 1, wherein said first means causes said second image-forming optical system to rotate around a predetermined axis in synchronism with deflecting action of said deflecting means.

3. The projecting optical system as set forth in claim 2, wherein said deflecting means performs an equi-angular speed deflection, and said first and second image-forming optical systems comprise an f−θ lens.

4. The projecting optical system as set forth in claim 2, wherein said deflecting means performs sinusoidal vibrations, and said first and second image forming optical systems comprise an f−arc sin θ lens.

5. A projecting optical system, comprising:
   (a) a first plane;
   (b) a first image-forming optical system, one of the focal planes of which is disposed on said first plane;
   (c) deflecting means to deflect parallel light beams from said first image-forming optical system in a predetermined direction;
   (d) a second image-forming optical system having the same distortional characteristic as that of said first image-forming optical system, and collecting the parallel light beams deflected by said deflecting means;

(e) a second plane disposed in substantial coincidence with one of the focal planes of said second image-forming optical system;
(f) first means to constantly maintain in parallel the optical axis of said first image-forming optical system after deflection by said deflecting means and the optical axis of said second image-forming optical axis; and
(g) second means to move said second plane in synchronism with deflecting action of said deflecting means.

6. A projecting optical system, comprising:
(a) a first plane;
(b) a first image-forming optical system, one of the focal planes of which is disposed on said first plane;
(c) deflecting means to deflect parallel light beams from said first image-forming optical system in a predetermined direction;
(d) a second image-forming optical system having the same distortional characteristic as that of said first image-forming optical system, and collecting the parallel light beams deflected by said deflecting means;
(e) a second plane disposed in substantial coincidence with one of the focal planes of said second image-forming optical system;
(f) first means to constantly maintain in parallel the optical axis of said first image-forming optical system after deflection by said deflecting means and the optical axis of said second image-forming optical axis; and
(g) third means to vary a light path length between said second image-forming optical system and said second plane in synchronism with deflecting action of said deflecting means.

7. A reading optical system, comprising:
(a) a scanning surface containing therein informations to be read;
(b) a first image-forming lens system, one of the focal planes of which is disposed on said scanning surface;
(c) deflector which deflects parallel light beams from said first image-forming lens system to a predetermined direction;
(d) a second image-forming lens system having the same distortional characteristic as that of said first image-forming lens system, and focuses said parallel light beams deflected by said deflector;
(e) photo-sensors disposed on the focal plane of said second image-forming lens system;
(f) means for tilting said second image-forming lens system in synchronism with deflection action of said deflector; and
(g) means for constantly maintaining the positions of said photosensors on the focal plane of said second image-forming lens system.

* * * * *